C. A. CAMPBELL.
INCANDESCENT GAS LAMP.
APPLICATION FILED SEPT. 9, 1909.
982,471.
Patented Jan. 24, 1911.
3 SHEETS—SHEET 1.
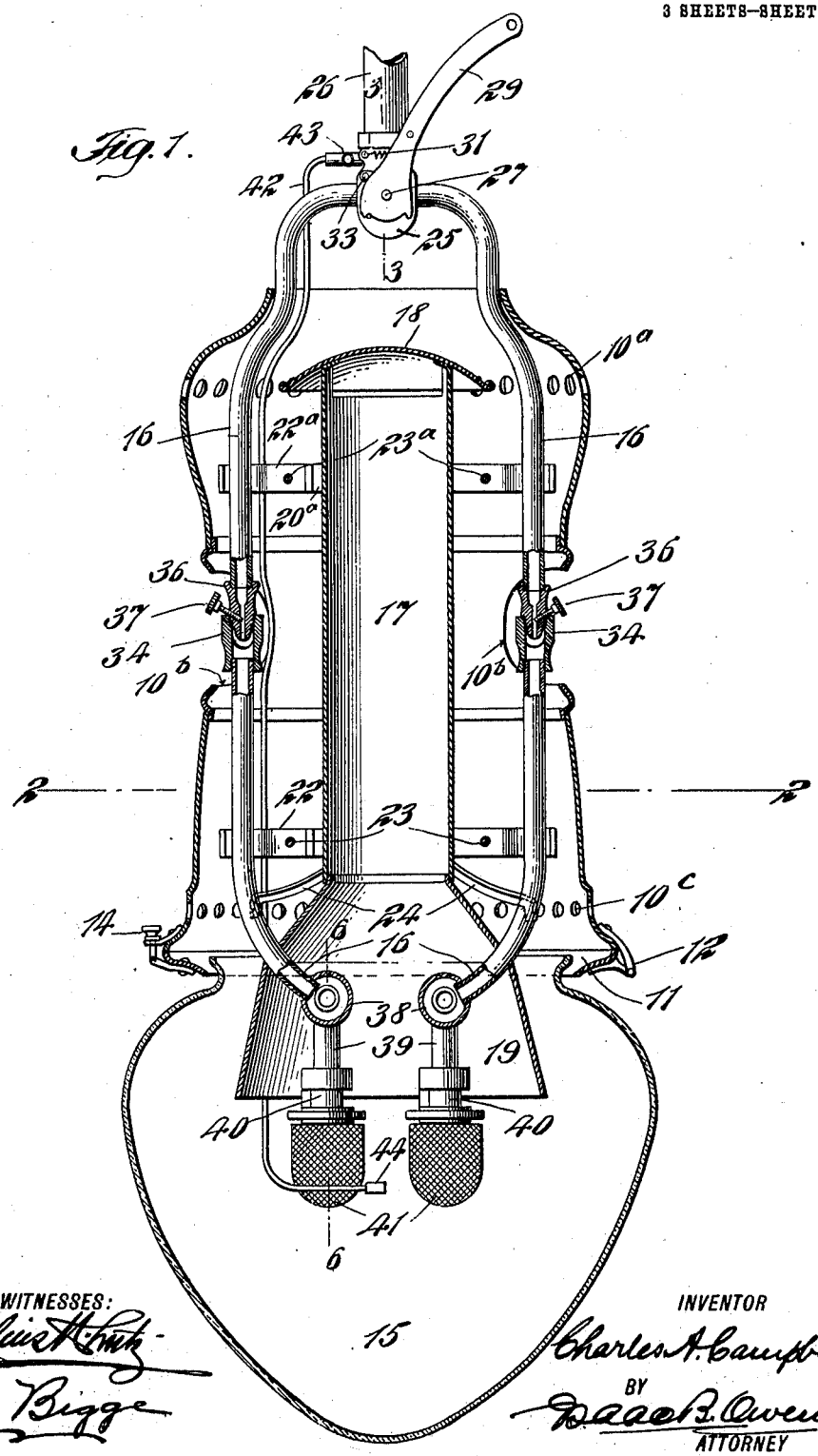
WITNESSES:
INVENTOR
Charles A. Campbell
BY
Isaac B. Owens
ATTORNEY C. A. CAMPBELL.
INCANDESCENT GAS LAMP.
APPLICATION FILED SEPT. 9, 1909.
982,471.
Patented Jan. 24, 1911.
3 SHEETS—SHEET 2.
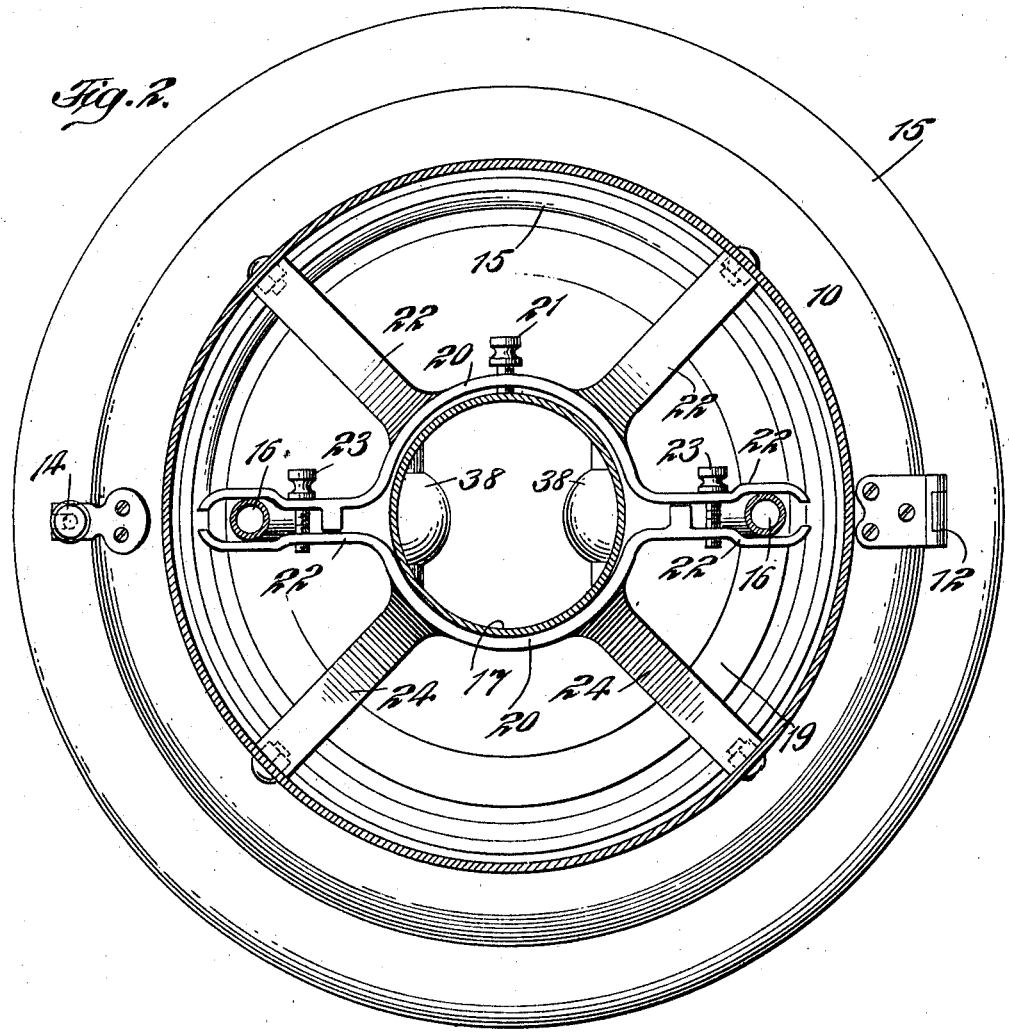
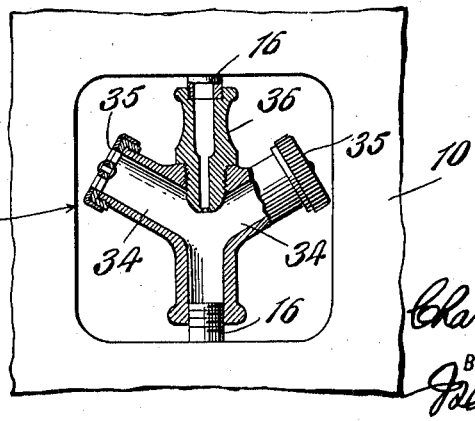

C. A. CAMPBELL.
INCANDESCENT GAS LAMP.
APPLICATION FILED SEPT. 9, 1909.
982,471.
Patented Jan. 24, 1911.
3 SHEETS—SHEET 3.
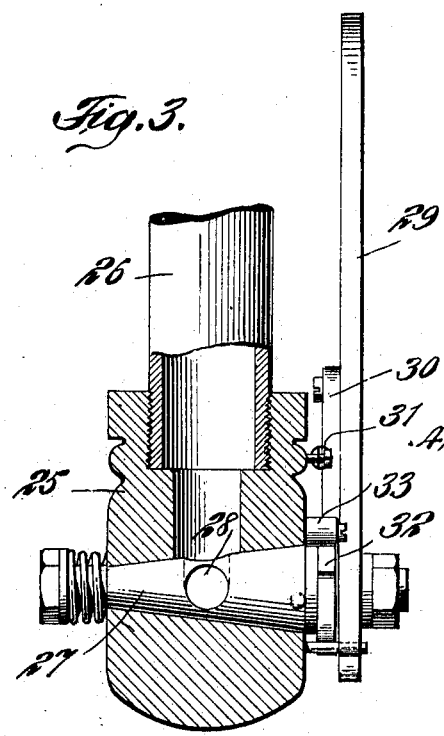
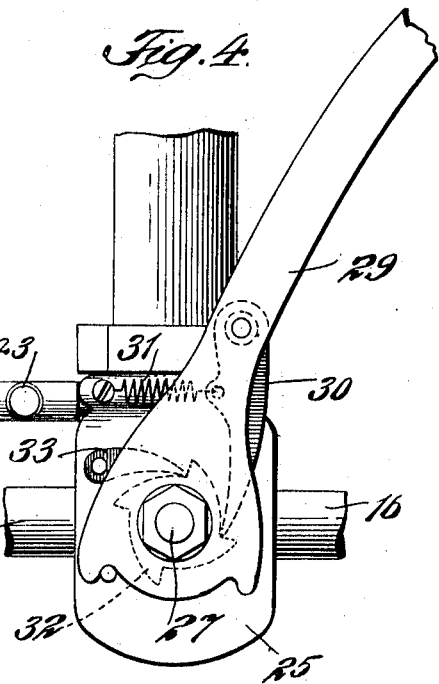
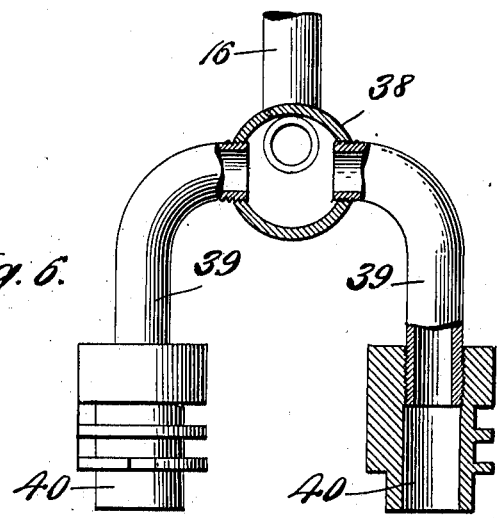
WITNESSES:
INVENTOR
Charles A. Campbell
BY
Isaac B. Owens
ATTORNEY

UNITED STATES PATENT OFFICE.

CHARLES A. CAMPBELL, OF BROOKLYN, NEW YORK.

INCANDESCENT GAS-LAMP.

982,471.  Specification of Letters Patent.  Patented Jan. 24, 1911.

Application filed September 9, 1909. Serial No. 516,882.

*To all whom it may concern:*

Be it known that I, CHARLES A. CAMPBELL, of Brooklyn, county of Kings, State of New York, have invented certain new and useful Improvements in Incandescent Gas-Lamps, of which the following is a full, clear, and exact specification, such as will enable others skilled in the art to which it appertains to make and use the same.

My invention relates to a multiple burner incandescent or Welsbach gas lamp of the inverted type. These lamps are commercially known by the trade misnomer "Inverted arc lamp."

Numerous attempts have been made to produce a successful commercial lamp of this type and such efforts have heretofore failed of success due principally to the intense heat generated and to the necessity of bringing the gas pipes down through the hot zone resulting in heating the gas to a high point before it enters the burner. This heating of the gas has two distinct and fatal objections. First, the gas tends to rise away from the burner instead of flowing toward the same, thus making it difficult to supply the burner with gas, and second, the gas when it reaches the burner is of such excessive temperature that it cannot be properly mixed with the air and give efficient results.

One of the most important objects of my invention therefore is to overcome this difficulty and to attain this end, briefly stated, I provide an outer drum through which passes a stack or intensifier. The intensifier is located over the burners and receives the hot gases of combustion carrying them upward to the top of the drum, while the gas is brought down inside of the drum, but outside of the intensifier the air for the mixture is caused to enter through the walls of the drum below the outlet of the intensifier and an additional quantity of air is admitted at the lower end of the intensifier where the burners are located and by way of openings in the bottom portion of the drum. In this way the heated gases degenerated by the burners are led through a distinct passage especially provided therefor and out of all contact with the gas and the air which mingles therewith to promote combustion.

Still a further object of my invention is to provide a construction which, while obtaining the high advantages above outlined, may be constructed of standard parts and on standard lines, thus reducing the cost of production and enabling me to sell the lamp at a price sufficiently low to bring about its widespread use, particularly in stores, halls and other large and more or less exposed places.

Still a further object of my present invention is to provide a four or other multiple burner lamp with a pilot light attachment so arranged that by the operation of a single cock the burners may be successively put in operation or extinguished as may be desired. This enables me to attain the distinct advantage of a lamp which may be operated at full or part power according to the light and other conditions and further a lamp in which one or more burners may be cut out of action permanently or temporarily to await repair or adjustment, while the other burners may be freely operated in the normal manner.

My invention involves various other features of importance, particularly relating to the Bunsen device and to the frame work and structure of the lamp, all of which contribute generally to the results above referred to and in addition are peculiarly adapted to the performance of their several individual functions, as will be fully set forth hereinafter and particularly pointed out in the claims.

The accompanying drawings represent as an example the preferred embodiment of my invention.

In these drawings:—Figure 1 is a central vertical section of the complete lamp; Fig. 2 is an enlarged horizontal section on the line 2—2 of Fig. 1 looking downward from the line section; Fig. 3 is a detailed section of the gas cock on the line 3—3 of Fig. 1; Fig. 4 is a side elevation of the gas cock and its operating device; Fig. 5 is a fragmentary side view of the drum showing the opening therein to admit the air to the Bunsen device and illustrating such device partly in section. Fig. 6 is a section on the line 6—6 of Fig. 1.

10 indicates the drum, which is formed of sheet metal in ornamental outline as partially shown in the drawing. This drum is intended in addition to its other functions to inclose the various parts of the lamps and to contribute highly to the ornamental effect. As will hereinafter appear, the construction which I have resorted to enables me to attain this end fully. Said drum is formed at its upper portion with an outward enlargement in which the outlet openings 10ª are produced for the escape of the gases of combustion. The middle portion of the drum is contracted and this contracted portion is formed with oppositely disposed openings 10ᵇ for the admission of air to the Bunsen devices. Finally, at its lower end the drum has openings 10ᶜ for the admission of an auxiliary air supply around the mantles and at the base of the stack or intensifier.

11 indicates a rim which is made symmetrical with the drum and connected to the lower edge thereof by a hinge 12. This rim is releasably held in its raised or normal position by a latch device 14 and said rim serves to carry the glass globe 15 of the lamp. The globe is preferably without openings so that the mantles are effectually protected from drafts of air and is arranged completely to envelope the burners.

16 indicates the main frame of the lamp, which is also the gas conduits. This frame is in the form of gas tubes and supports the lamp through its connection with the gas supply pipe or other fixture of the building in which the lamp is installed.

17 indicates the stack or intensifier, the upper end of which opens at the plane of the openings 10ª and is provided with a cap 18 which deflects hot gases downward into the enlarged upper portion of the drum and causes them to escape at this end. The lower end of the intensifier is formed with an enlarged hood 19 at the bottom and serving a purpose which will hereinafter fully appear. Surrounding the intensifier immediately above the hood 19 is a clamp or holder shown best in Fig. 2 and comprising two semi-circular sections 20, one of which is furnished with a screw 21 or other means for fastening it to the intensifier. Said semi-circular sections 20 have radial arms 22 which embrace the tubes 16 in pairs and are clamped against the same by screws 23. Projecting downward and outward from each section 20 are preferably two arms 24 which are fastened to the lower part of the drum as shown. This construction it will be observed fastens the intensifier firmly to the frame tubes 16 and further rigidly mounts the drum in its proper position. To further brace the lamp I provide at the upper part of the intensifier a holder or bracket composed of parts 20ª, 22ª and 23ª, which are of the same structure and function as the parts 20, 22 and 23 and which serve the same function, to wit, that of fastening rigidly together the intensifier and frame tubes. It will thus be seen that I provide an extremely strong frame structure without the necessity of utilizing expensive and delicate parts and further I employ many of these frame parts as active operative parts of the lamp, all of which will fully appear hereinafter.

The gas and frame tubes 16 bend inward toward each other at their upper ends and unite at the body 25 of the gas cock which is adapted to be screwed to the gas pipe of the building or to any other suitable supply pipe, a fragment of which is illustrated at 26 of Fig. 1. As shown best in Fig. 3, the plug 27 of this gas cock is formed with a three-way port 28. This plug is adapted to rotate in the body 25 of the cock in such a manner that it may take successively four different positions, to wit; first, to close both tubes 16 from the gas supply; second, to open one tube to the gas supply; third, to open both tubes to the gas supply and fourth, to cut off one tube. For operating this cock, I prefer to employ an arm 29 rocking loosely on the stem of the plug and provide it with a pivoted dog 30 engaging a ratchet 32 fastened to said stem. The dog 30 has a spring 31 which serves the double purpose of returning the arm 29 to a raised position and maintaining the dog 30 in engagement with the ratchet. 33 indicates a pawl, which prevents back motion of the ratchet and plug. A chain or other connection is attached to the arm 29 and by giving this chain a number of successive pulls the cock is caused to take its various positions above explained, the spring 31 returning the arm 29 and dog 30 after each pull on the chain.

Opposite the openings 10ᵇ in the drum 10 the gas tubes 16 are divided and have inserted therein the air mixing devices which comprise a Y-fitting 34, branches of which are open to the atmosphere through the openings 10ᵇ in the drum and are furnished with air shutters 35 to regulate the air supply. The gas nozzle 36 enters the Y-fitting 34 between its branches and is furnished with a regulating screw or valve 37 (see Fig. 1). The gas flows through the nipple 36 regulated in quantity by the valve 37 and in passing through the fitting 34 causes the air to be drawn in past the shutters 35 forming the Bunsen mixture. It is pointed out that this mixture may be easily and completely regulated by the valve 37 and air shutters 35 adapting the lamp to various conditions as to gas pressure and quality. At their lower extremities the tubes 16 curve inward slightly and pass snugly through openings in the enlarged lower end or hood 19 of the intensifier. At such ends they communicate with unions 38 from which burner tubes 39 extend outward and downward. These burner tubes terminate shortly below the lower extremity of the hood 19 and are provided with a valve 43 by which the gas supply is regulated. This tube extends downward inside of the drum but outside of the intensifier and terminates in a burner tip 44 in the center of the cluster of mantles of which it will be seen there are four, two for each gas tube 16.

In the operation of the burner a minute quantity of gas passes continuously through the pilot light tube and burns at the tip 44. The gas valve or check 37 and the air shutters 35 should be regulated to form a proper Bunsen mixture which passes down the tubes 16 and into the four burners. This gas is ignited instantly by the pilot light. The intensely heated gases of combustion generated at the burners pass upward and are all collected in the hood 19, from which they pass upward through the intensifier and escape at the upper end thereof. The cap 18 deflects these gases outward into the enlarged upper end of the drum from which the gases escape through the openings 10$^a$. This furnishes a direct and isolated passage for the gases of combustion and avoids contact of the same with the gas on its way to the burners and avoids heating the air which is required to form the Bunsen mixture. This air, it will be seen, is drawn in cold from the atmosphere outside of the drum below the point at which the exhaust gases escape. When the gas cock 27 is closed, the light of course is extinguished, the pilot light alone burning. Upon first pulling down the arm 29 the plug is turned to admit gas to one of the tubes 16 and the lamp then burns with two mantles only, giving one-half of its total light. Upon again turning the cock 27 gas is admitted to the second tube 16 and then the lamp operates at its full capacity. A third motion of the arm and cock causes one of the tubes to be closed, reducing the number of lights, and a fourth motion of the cock completely extinguishes the lamp except, of course, for the pilot light. This operation it will be seen results in a very important advantage, to wit, that of enabling the user of the lamp to employ one-half of its capacity at any time. For example, early in the evening the lamp need not be operated to its full capacity, while later, or at any time desired, it may be turned on in full. To reach the mantles for repair or replacement it is only necessary to detach the latch 14, whereupon the globe swings down exposing the mantle.

Having thus described my invention what I claim as new and desire to secure by Letters Patent of the United States, is:

1. An inverted incandescent gas lamp having a gas tube extending downward to the burner, an adjustable air admission device communicating with said tube above the burner, a drum inclosing the tube and having an opening in its side adjacent to said adjustable air admission device, said opening supplying air to said device and affording manual access thereto.

2. An inverted gas lamp having a burner, a gas tube extending downward to the same, an adjustable air admission device communicating with the gas tube above the burner, a gas regulating device adjacent said air admission device, and a drum inclosing said gas tube and having an opening in its side adjacent to said adjustable air admission device and gas regulating device, said opening supplying air to said air admission device and affording manual access to both devices.

3. An inverted incandescent gas lamp having a vertically disposed gas tube, an adjustable air admission device therein, a burner at the lower end of said tube, a stack above the burner and open at its upper end to carry off the exhaust gases and a drum inclosing the tube and stack and having an opening in its side adjacent to the adjustable air admission device, said opening supplying air to said air admission device and affording manual access thereto.

4. An inverted incandescent gas lamp having a vertically disposed gas tube, adjustable air admission and gas regulating means therein, a burner at the lower end of said tube, a stack above the burner and open at its upper end to carry off the exhaust gases, a drum inclosing the tube and stack and having an opening in its side adjacent the stack and gas tube, said opening supplying air and affording manual access to said means.

5. An inverted incandescent gas lamp having two vertically disposed gas tubes, a burner communicating with the lower end of each tube, an adjustable air admission device communicating with each tube above the burners, a drum inclosing said tubes and having openings in its side adjacent to said air admission devices and affording air and manual access thereto, and a stack mounted within the drum and extending vertically therein above the burners to carry the gases of combustion through the drum above said openings in the side thereof.

6. An inverted incandescent gas lamp having a central gas supply pipe, a vertically disposed gas tube extending downward therefrom, a burner communicating with the lower end of said tube, an air admission device communicating with said tube above the burner, a drum inclosing said tube and having its side apertured adjacent to said air admission device, a stack mounted within the drum and extending vertically therein above the burner to carry the gases of combustion through the drum above said apertured portion of the drum, the upper part of the drum having orifices adjacent to the upper end of the stack, and a deflector above the upper end of the stack and below said central gas supply pipe to direct the gases of combustion outward to said orifices.

7. An inverted incandescent gas lamp having a central gas supply pipe, two vertically disposed gas tubes extending downward therefrom, a burner communicating with the lower end of each tube, an air admission device communicating with each tube above the burners, a drum inclosing said tubes and having openings in its side adjacent to said air admission devices, a stack mounted within the drum and extending vertically therein above the burners to carry the gases of combustion through the drum above said openings in the side thereof, the upper portion of the drum being enlarged and having orifices through its side walls adjacent to the upper end of the stack, and a deflector above the upper end of the stack and below said central gas supply pipe to direct the gases of combustion outward to said orifices.

8. An inverted incandescent gas lamp having two vertically disposed frame members, a drum inclosing said frame members, burners, a stack mounted within the drum over said burners, and a holder embracing and holding the stack and frame members and having arms rigidly secured to said drum, whereby the drum, stack and frame members are rigidly connected together.

9. An inverted incandescent gas lamp having two vertically disposed gas tubes, a burner communicating with the lower end of each tube, a drum inclosing said tubes, a stack mounted within the drum and extending vertically therein above the burners to carry the gases of combustion through the drum, and holders for rigidly connecting the drum, stack and gas tubes, comprising sectional clamps embracing the stack, with extensions engaging the gas tubes, and the portions of such clamps embracing said stack having outward projecting arms fastened to the drum.

10. An inverted incandescent gas lamp having a central gas supply pipe, a burner, a stack above the same to carry off the burned gases, a gas tube extending down to the burner from said supply pipe outside of the stack, a drum inclosing the stack and tube, a globe inclosing the burner, means for mounting the same at the lower end of the drum, an air admission device communicating with the gas tube, said drum having an opening therein adjacent to said air admission device, and a deflector for deflecting the gases laterally from the upper end of the stack, said deflector being disposed below said central gas supply pipe and said drum having exit orifices in its upper portions adjacent said deflector.

11. An inverted incandescent gas lamp having two gas tubes, burners supplied thereby, a gas supply pipe from which said gas tubes extend, and a gas cock at the junction of said pipe and tubes, said cock having a three-way plug adapted in different positions to place said supply pipe in communication with said tubes respectively and at an intermediate position to place said pipe in communication with both tubes.

In testimony whereof I have signed my name to this specification in the presence of two subscribing witnesses.

CHARLES A. CAMPBELL.

Witnesses:
ISAAC B. OWENS,
B. BIGGE.